United States Patent Office 3,434,953
Patented Mar. 25, 1969

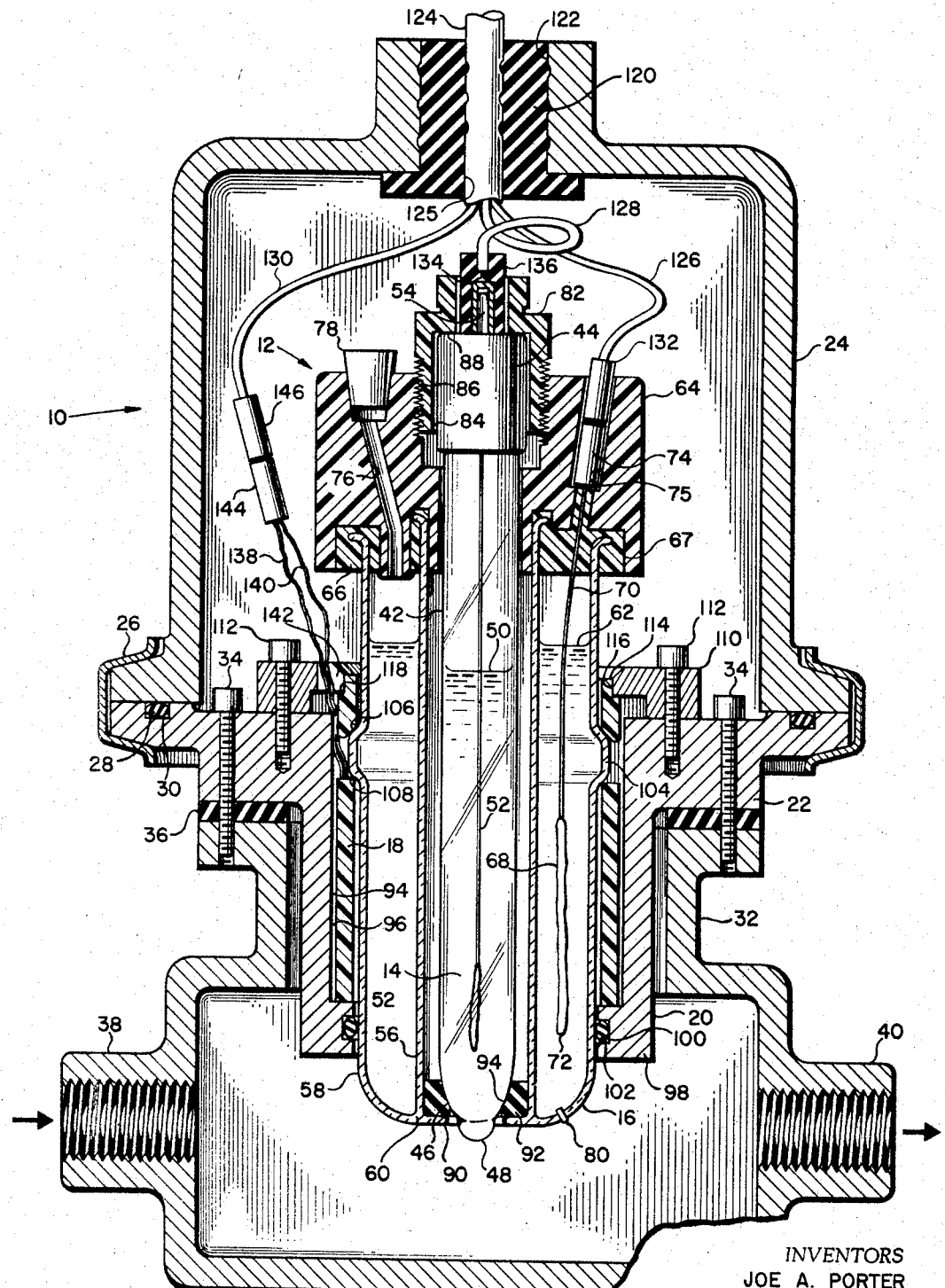

3,434,953
ELECTROCHEMICAL ELECTRODE ASSEMBLY
Joe A. Porter, Whittier, and Ronald F. Waters, Riverside, Calif., assignors to Beckman Instruments, Inc., a corporation of California
Filed June 28, 1966, Ser. No. 561,144
Int. Cl. B01k 3/12, 3/04, 3/06
U.S. Cl. 204—195                              7 Claims This invention relates generally to an electrochemical electrode assembly and, more particularly, to such an assembly which is particularly suited for the measurement of the ion concentrations of solutions in process applications.

At the present time, for measuring the ion concentrations of solutions in process applications, a variety of electrode elements, including ion sensing electrodes, reference electrodes and thermocompensators, are mounted separately in suitable cells through which the process stream flows. Such cells are characterized in that they are bulky and unsymmetrical and therefore unbalanced, thereby rendering their mounting in process ducts, etc., somewhat difficult. Also, it is difficult and time consuming to replace any of the electrode elements in the cells.

It is, therefore, the principal object of the present invention to provide an improved electrochemical electrode assembly for measuring ion concentrations of solutions.

Another object of the invention is to provide an electrochemical electrode assembly in which the sensing electrode, reference electrode and thermocompensator may be readily replaced.

According to the principal aspect of the present invention, there is provided an electrochemical electrode assembly in which the reference electrode portion thereof comprises inner and outer glass tubes sealed at one end to form an annular reservoir for a salt bridge solution. The reference electrode includes an internal half cell in the reservoir and a liquid junction providing a flow path for the salt bridge solution to the sample medium. The sensing electrode of the assembly is replaceably mounted within the inner tube of the reference electrode. An annular seal is provided between the sensing electrode and the inner tube of the reference electrode to prevent the entry of process fluid into the electrode assembly. Thus, by the present invention, if the sensing electrode is damaged, which often occurs is process stream applications, or when it is desired to replace the electrode with another which is sensitive to different ions in the sample medium, such can be accomplished readily and without the necessity of replacing a unitary sensing-reference electrode assembly, which is more expensive than sensing electrodes per se.

Other objects, aspects and advantages will become more apparent from the following description taken in connection with the accompanying drawing wherein a preferred form of the electrochemical electrode assembly of the invention is illustrated in longitudinal section.

Referring now to the drawing in detail, the electrochemical electrode assembly of the invention, generally designated by numeral 10, comprises an electrode unit 12 which includes a sensing electrode 14, reference electrode 16 and thermocompensator 18 mounted in a tubular envelope 20. The envelope 20 has an outwardly extending flange 22. A housing 24 enclosing the upper portion of the electrode unit 12 is mounted on the flange 22 of the envelope 20 by a suitable coupling 26. Preferably, the coupling 26 is of the V-band type, as well known in the art, incorporating a toggle clamp (not shown) which permits the housing 24 and flange 22 to be readily affixed to each other and easily disassembled. A rubber O-ring 28 is positioned in an annular groove 30 in the flange 22 to provide a seal between the housing 24 and the flange.

To the lower surface of the flange 22 there is mounted a flow chamber 32 by screws 34. An annular gasket 36 is positioned between the flow chamber 32 and flange 22 for sealing purposes. The chamber 32 includes an inlet port 38 and outlet port 40 permitting the flow of a process stream through the chamber and past the lower portion of the electrode unit 12. The ports 38 and 40 are screw threaded to permit the connection of the flow chamber to suitable ducting for the process stream. It can be appreciated that the flow chamber 32 is not required when the electrode assembly of the invention is utilized in an application in which the assembly is immersed in the solution being analyzed.

Referring now to the electrode unit 12 in detail, the sensing electrode 14 comprises a glass tube 42 closed at its upper end by a cap 44 and converging at its lower portion 46 to an ion sensitive barrier 48, shown as a bulb of ion sensitive glass. It can be appreciated that the barrier 48 may be formed of other ion sensitive materials, such as a silver-silver chloride pellet which is sensitive to chloride ions. The sensing electrode 14 holds a suitable electrolyte 50 in which there is immersed a conventional internal half cell 52. The half cell is connected to an electrical male plug element 54 which extends through the top of the cap 44.

The reference electrode portion 16 of the assembly includes coaxial inner and outer glass tubes 56 and 58, respectively, which are sealed at their lower end 60 to provide an annular reservoir for a salt bridge solution 62. The upper end of the tubes 56 and 58 are closed by a plastic cap 64 and suitable plastic 66 filling the cavity 67 in the lower portion of the cap 64. An internal half cell 68 is positioned in the annular reservoir defined between the tubes 56 and 58 for immersion in the salt solution 62. The half cell 68 may be a silver wire 70 coated at its lower end with silver chloride 72. The half cell 52 for the sensing electrode may be of the same form. The silver wire 70 provides a conductor which extends into the cap 64 and terminates with an electrical plug 74 sealed into a passage 75 in the cap.

A passage 76 closed by a plug 78 is provided in the cap 64 to permit the refilling of the reference electrode with salt solution 62. A liquid junction structure 80 is provided in the outer glass tube 58 adjacent the lower portion of the reference electrode 16 to permit the flow of salt solution 62 into the sample medium.

A threaded element 82 having cavity 84 receiving the upper end of the cap 44 of the sensing electrode is screw threaded into a threaded opening 86 in the upper portion of the cap 64. As seen in the drawing, the inner wall 88 of the cavity 84 bears against the top of the cap 44. At the lower end of the inner glass tube 66 of the reference electrode 16 there is provided an inwardly extending flange 90. The flange 90 supports a rubber annular seal 92 which has an inner surface 94 conforming substantially, but not exactly, to the configuration of the converging portion 46 of the sensing electrode. It can be appreciated that by threading the element 82 into the threaded opening 86 of the cap 64, longitudinal pressure will be exerted upon the sensing electrode 14 thus forcing the converging portion 46 thereof against the rubber seal 92 and effecting a tight seal between the inner glass tube 56 and the sensing electrode whereby the process stream cannot enter the electrode assembly. Thus, by this arrangement, it can be appreciated that by the removal of the threaded element 82, the sensing electrode 14 may be readily removed from the reference electrode 16 and replaced, with suitable sealing being provided between the two elements to permit the electrode unit 12 to be utilized in high pressure process stream applications.

The tubular envelope 20 which surrounds the outer tube 58 of the reference electrode has its inner wall 95 spaced from the outer tube 58 to provide an annular space 96 in which the annular thermocompensator 18 is positioned. Except for the annular configuration of the thermocompensator 18, its construction forms no part of the present invention and therefore will not be described in detail. The envelope 20 has an inwardly extending flange 98 with an inner diameter slightly greater than the outer diameter of the tube 58 whereby the end of the tub 58 of the reference electrode may be passed through the flange 98. The flange has an annular groove 100 in which there is positioned an O-ring 102 sealing the flange to the tube 58.

In order to prevent the reference electrode 16 from sliding through the opening in the end of the tubular envelope 20, there is provided an outwardly extending annular shoulder 104 in the outer tube 58. The shoulder 104 has an upper surface 106 and a lower surface 108 which bears against the upper surface of the thermocompensator 18, thus fixing the position of the reference electrode 16 and sensing electrode 14 within the envelope 20.

In order to fixedly mount the electrode unit 12 within the envelope 20, there is provided a ring element 110 which is affixed to the envelope 20 via screws 112. A flexible split-ring 114, formed of a material such as plastic, is slipped about the outer tube 58 of the reference electrode with its lower surface bearing against the upper surface 106 on the shoulder 104. The ring element 110 has an inner diameter greater than the outer diameter of the shoulder 104 to permit the electrode unit 12 to be passed through the ring element during assembly and disassembly of the electrode unit 12 into the envelope 20. The inner portion 116 of the ring element 110 bears against a shoulder 118 of the split-ring 114 whereupon the mounting of the ring element 110 on the flange 22 by the screws 112 results in an axial force being exerted against the shoulder 118 of the split-ring 114 thereby rigidly mounting the electrode unit 12 within the assembly. It can be readily appreciated that by removal of the ring element 110, the electrode unit 12 including the sensing electrode 14 and the reference electrode 16 may be removed from the envelope 20 and the split-ring 114 may be removed to permit the electrode unit to be passed through the ring element 110 for replacement of both the reference and sensing electrodes, if desired. Thus, by the present invention, not only may the sensing electrode of the assembly be readily replaced, but also the reference electrode and the thermocompensator 18 when the electrode unit 12 is removed from the envelope 20.

A rubber plug 120 is mounted in sealing relationship within an opening 122 at the upper end of the housing 24. A suitable cable 124 is passed through an opening 125 in the plug 120 in sealing relationship therewith, whereby there is provided a housing 24 which is hermetically sealed so that liquid cannot enter the housing when it is immersed in a sample medium. The cable 124 carries three insulated conductors 126, 128 and 130. The conductor 126 terminates in a connector 132 which is connected to the electrical plug 74 for the half cell 68 of the reference electrode. The plug 74 and connector 132 are mounted with a tight fit within the passage 75 in the cap 64 so as to be sealed therein. The conductor 128 terminates in a female connector 134 which slidably receives the plug 54 of the sensing electrode. The connector 134 is sealed into a suitable nonconductive housing 136 which is positioned in the upper portion of the element 82.

The thermocompensator 18 has a pair of insulated conductors 138 and 140 which pass through a slot 142 in the ring element 110 and terminate in a plug 144. The plug is connected to a suitable connector 146 at the end of the conductor 130. Preferably the connectors 132, 134 and 146 and the plugs therefor 74, 54 and 144, respectively, are the axial sliding type which permits quick engagement and disengagement of the plugs with the connectors. Also, preferably the connectors and plugs provide a hermetic seal when assembled to ensure that moisture does not reach the electrical leads for the sensing and reference electrodes and the thermocompensator.

Although only one embodiment of the invention has been disclosed herein for purposes of illustration, it will be understood that vraious changes can be made in the form, details and arrangement and proportions of the various parts in such embodiment without departing from the spirit and scope of the invention as defined by the appended claims.

What is claimed is:

1. An electrochemical electrode assembly comprising:
   inner and outer tubular members spaced apart and sealed at one end thereof to define an annular reservoir for a salt bridge solution;
   cap means closing said other end of said inner and outer tubular members;
   an internal half cell positioned in said reservoir for contacting said salt bridge solution;
   liquid junction means in said outer tubular member adjacent to said one end;
   an ion sensing electrode including a tube closed at one end by an ion sensitive barrier, said tube having a cross-sectional area less than that of said inner tubular member;
   means replaceably mounting said ion sensing electrode coaxially within said inner tubular member with said ion sensitive barrier adjacent to said one end of said tubular members; and
   annular sealing means between said tube of said ion sensing electrode and said inner tubular member.

2. An electrochemical electrode assembly as set forth in claim 1 including:
   a tubular envelope surrounding and spaced from said outer tubular member to define an annular space;
   annular sealing means adjacent to said one end of said tubular members for sealing said envelope to said outer tubular member; and
   annular thermocompensating means replaceably mounted in said annular space.

3. An electrochemical electrode assembly as set forth in claim 2 wherein said tubular envelope includes an outwardly extending annular flange having an upper surface;
   said outer tubular member having an outwardly extending annular shoulder, said shoulder having a lower surface supported by said annular thermocompensating means and an upper surface adjacent to said upper surface of said tubular envelope annular flange; and
   ring means replaceably mounted on said upper surface of the tubular envelope annular flange bearing against said upper surface on said annular shoulder whereby said outer tubular element is secured in said tubular envelope.

4. An electrochemical electrode assembly as set forth in claim 3 wherein said ring means includes:
   a ring element having an inner diameter greater than the diameter of said annular shoulder and a flexible split ring surrounding said outer tubular element and bearing against said upper surface on said annular shoulder; and
   said ring element bearing against the upper portion of said split ring.

5. An electrochemical electrode assembly as set forth in claim 2 including:
   a conductor for said internal half cell terminating with an electrical plug sealed into said cap means;

said ion sensing electrode including an electrical plug in said mounting means;

said thermocompensating means having a pair of insulated conductors terminating in an electrical plug outside of said annular space and adjacent to said cap means;

a housing enclosing said cap means, mounting means and each of said plugs;

quick disconnectable coupling means affixing said housing to said tubular envelope; and a cable extending through and sealed into the wall of said housing and including a plurality of insulated conductors terminating in electrical connectors for connection to respective ones of said electrical plugs.

6. An electrochemical electrode assembly as set forth in claim 1 wherein said mounting means for said ion sensing electrode comprises an element screw threaded into said cap means in axial alignment with the longitudinal axis of said ion sensing electrode and bearing against the other end of said electrode.

7. An electrochemical cell as as forth in claim 6 wherein said inner tubular member has an inwardly extending flange thereon;

said tube of said ion sensing electrode having a portion converging toward said ion sensitive barrier; and said annular sealing means being carried by said inwardly extending flange and bearing against said converging portion of said ion sensing electrode whereupon threading of said screw threaded element into said cap means deforms said annular sealing means and effects a liquid tight seal between said tube of said ion sensing electrode and said inner tubular member.

References Cited

UNITED STATES PATENTS

| 2,884,365 | 4/1959 | De Bolt et al. | 204—195 |
| 3,049,118 | 8/1962 | Arthur et al. | 204—195.1 |
| 3,211,638 | 10/1965 | Halvorsen | 204—195 |
| 3,226,313 | 12/1965 | Riseman | 204—195.1 |

FOREIGN PATENTS

| 677,471 | 3/1952 | Great Britain. |
| 1,090,451 | 10/1960 | Germany. |

JOHN H. MACK, *Primary Examiner.*

T. TUNG, *Assistant Examiner.*

U.S. Cl. X.R.

204—272